US009206888B2

(12) United States Patent
Yoneda et al.

(10) Patent No.: US 9,206,888 B2
(45) Date of Patent: Dec. 8, 2015

(54) AUTO-TENSIONER

(75) Inventors: Tetsuo Yoneda, Kobe (JP); Katsuya Imai, Kobe (JP)

(73) Assignee: Mitsuboshi Belting Ltd., Hyogo (JP)

( * ) Notice: Subject to any disclaimer, the term of this patent is extended or adjusted under 35 U.S.C. 154(b) by 140 days.

(21) Appl. No.: 14/113,717

(22) PCT Filed: Apr. 27, 2012

(86) PCT No.: PCT/JP2012/061467
§ 371 (c)(1),
(2), (4) Date: Oct. 24, 2013

(87) PCT Pub. No.: WO2012/147957
PCT Pub. Date: Nov. 1, 2012

(65) Prior Publication Data
US 2014/0051533 A1    Feb. 20, 2014

(30) Foreign Application Priority Data

Apr. 28, 2011 (JP) ................................. 2011-100826
Mar. 9, 2012 (JP) ................................. 2012-052991

(51) Int. Cl.
*F16H 7/10* (2006.01)
*F16H 7/12* (2006.01)
*F16H 7/08* (2006.01)

(52) U.S. Cl.
CPC ................ *F16H 7/10* (2013.01); *F16H 7/1218* (2013.01); *F16H 2007/081* (2013.01); *F16H 2007/0893* (2013.01)

(58) Field of Classification Search
CPC .................. F16H 2007/081; F16H 2007/084; F16H 7/1218; F16H 7/1281; F16H 2007/0893
USPC .................................................. 474/112, 135
See application file for complete search history.

(56) References Cited

U.S. PATENT DOCUMENTS 4,285,676 A * 8/1981 Kraft .............................. 474/135
4,464,146 A * 8/1984 Arthur ......................... 474/133

(Continued)

FOREIGN PATENT DOCUMENTS

CN         100561008 C      11/2009
DE    10 2007 031 298       1/2009

(Continued)

OTHER PUBLICATIONS

Chinese Office Action issued in corresponding Chinese Patent Application No. 201280020554.7, Jul. 20, 2015, 22 pages—with an English translation.

*Primary Examiner* — Henry Liu
(74) *Attorney, Agent, or Firm* — Hamre, Schumann, Mueller & Larson, P.C.

(57) ABSTRACT

An auto-tensioner includes: a stationary member having a first cylindrical portion; a rotatable member having a second cylindrical portion at least partially overlapping the first cylindrical portion in a radial direction; and a drainage mechanism provided at a boundary part of the first and second cylindrical portions, including a water inlet configured by a gap between an outer peripheral surface of the first cylindrical portion and an outer peripheral surface of the second cylindrical portion and being open along a peripheral direction, a water passage which is configured by a gap between a water collecting groove formed along the peripheral direction in the outer peripheral surface of one of the two cylindrical portions and the other cylindrical portion, and communicates with the water inlet, and at least one drainage port formed in a peripheral wall on an outside in the radial direction of the water passage.

5 Claims, 8 Drawing Sheets

(56) References Cited

U.S. PATENT DOCUMENTS

| | | | |
|---|---|---|---|
| 5,632,697 A | 5/1997 | Serkh | |
| 5,647,813 A * | 7/1997 | Serkh | 474/135 |
| 6,165,091 A * | 12/2000 | Dinca et al. | 474/112 |
| 6,464,604 B1 * | 10/2002 | Frankowski et al. | 474/117 |
| 6,609,988 B1 * | 8/2003 | Liu et al. | 474/133 |
| 7,662,057 B2 * | 2/2010 | Baumuller et al. | 474/112 |
| 8,142,314 B2 * | 3/2012 | Antchak et al. | 474/135 |
| 8,485,925 B2 * | 7/2013 | Antchak et al. | 474/135 |
| 2002/0039944 A1 * | 4/2002 | Ali et al. | 474/135 |
| 2003/0008739 A1 * | 1/2003 | Asbeck et al. | 474/135 |
| 2009/0181815 A1 | 7/2009 | Guhr | |
| 2010/0184546 A1 * | 7/2010 | Singer | 474/135 |
| 2014/0031157 A1 * | 1/2014 | Takano et al. | 474/135 |

FOREIGN PATENT DOCUMENTS

| | | |
|---|---|---|
| JP | 9-042392 | 2/1997 |
| JP | 9-189348 | 7/1997 |
| JP | 2003-254399 | 9/2003 |
| JP | 2004-204937 | 7/2004 |
| JP | 2005-069356 | 3/2005 |
| JP | 2005-299810 | 10/2005 |
| JP | 2006-057743 | 3/2006 |
| JP | 2009-533619 | 9/2009 |
| JP | 2010/112549 | 5/2010 |
| WO | 02/095262 | 11/2002 |
| WO | 2010/041747 | 4/2010 |

* cited by examiner

AUTO-TENSIONER

TECHNICAL FIELD

The present invention relates to an auto-tensioner which moderately maintains the tension of a belt.

BACKGROUND ART

Hitherto, for example, in an auxiliary machine drive system of a vehicle engine or the like, an auto-tensioner has been employed in order to prevent a belt slip at the time when the tension of a belt is changed.

For example, an auto-tensioner described in Patent Document 1 has a stationary member, a rotatable member which is supported to be able to rotate relative to the stationary member, and a coil spring which biases the rotatable member to rotate relative to the stationary member. A pulley on which a belt is wound is mounted to the rotatable member. The stationary member and the rotatable member have outer cylindrical portions for accommodating the coil spring therein. Further, on the insides of the outer cylindrical portion of the stationary member and the outer cylindrical portion of the rotatable member, in addition to the coil spring, friction members are arranged for damping the oscillation of the rotatable member. The friction members are allowed to slide on the stationary member or the rotatable member when the rotatable member rotates.

During the use of the auto-tensioner, muddy water, engine oil, and the like stick to the outer surface of the stationary member or the rotatable member and infiltrate into the inside through the gap between the stationary member and the rotatable member. When the muddy water and the like infiltrate between the friction member made of a rubber or a synthetic resin and a sliding object (the stationary member or the rotatable member), wear of the friction member is accelerated, and a damping effect is reduced due to a reduction in braking force. Moreover, there was concern that the infiltrating muddy water and the like may have an adverse effect on the durability of members other than the friction members.

As the auto-tensioner which prevents the infiltration of muddy water and the like, for example, there is one disclosed in Patent Document 2. The auto-tensioner has a structure in which a lip is formed to extend outward from a part of the peripheral edge of an opening portion of a stationary member (tensioner cup) and an outer race portion of a rotatable member (tensioner arm) extends to cover the lip, thereby suppressing the infiltration of muddy water and the like. The lip is disposed so as to be on the upper side when the engine is mounted. In addition, between the inner peripheral surface of the opening portion of the stationary member and the outer peripheral surface of an inner race portion of the rotatable member, a friction member (damping band) is disposed over the entire periphery.

RELATED ART DOCUMENTS

Patent Literature

Patent Document 1: JP-A-2010-112549
Patent Document 2: JP-A-2004-204937

SUMMARY OF THE INVENTION

Problems to be Solved by the Invention

However, in the structure of Patent Document 2, the lip which protrudes outward from the peripheral edge of the opening portion of the stationary member acts as a bulwark and can impede the infiltration of muddy water and the like, but any guide means for actively discharging muddy water and the like is not provided. Therefore, muddy water and the like move downward along the outer peripheral surface of the stationary member and then easily collect between the lower portion of the outer peripheral surface of the stationary member and the lower portion of the outer race portion of the rotatable member, and thus there is concern that this may then infiltrate into the inside.

Here, an object of the present invention is to provide an auto-tensioner capable of suppressing the infiltration of muddy water and the like into the inside and actively collecting and smoothly discharging the muddy water and the like.

Means for Solving the Problems

An auto-tensioner of a first aspect of the present invention includes:

a stationary member having a first cylindrical portion;

a rotatable member which has a second cylindrical portion of which at least a part is disposed to overlap the first cylindrical portion in a radial direction, and is supported rotatably relative to the stationary member;

a coil spring which is accommodated on insides of the first cylindrical portion and the second cylindrical portion and has one end locked to the stationary member and the other end locked to the rotatable member; and a drainage mechanism provided at a boundary part of the first cylindrical portion and the second cylindrical portion, in which the drainage mechanism includes a water inlet configured by a gap between an outer peripheral surface of the first cylindrical portion and an outer peripheral surface of the second cylindrical portion and being open along a peripheral direction, a water passage which is configured by a gap between a water collecting groove formed along the peripheral direction in the outer peripheral surface of one of the two cylindrical portions and the other cylindrical portion, and communicates with the water inlet, and at least one drainage port formed in a peripheral wall on an outside in the radial direction of the water passage.

In this configuration, in a case where the auto-tensioner is disposed so that the cylinder axial direction thereof is in a direction other than the upward and downward direction (for example, substantially in a horizontal direction), muddy water and the like flowing into the water inlet flow into the water passage provided on the inside in the radial direction of the water inlet, move downward along the peripheral direction in the water passage, and thereafter, are discharged to the outside from the drainage port. Therefore, the collected muddy water and the like can be smoothly discharged while suppressing the infiltration of the muddy water and the like into the inside of the auto-tensioner.

According to the auto-tensioner of a second aspect of the present invention, in the first aspect, the water collecting groove has a depth direction in a cylinder axial direction of the cylindrical portion, and the cylindrical portion of the two cylindrical portions, in which no water collecting groove is formed, has a tip end portion inserted into the water collecting groove.

In this configuration, since the tip end portion of the cylindrical portion in which no water collecting groove is formed is inserted into the water collecting groove, the water passage has a U shape. Accordingly, muddy water and the like flowing into the water inlet flow into an outside part in the radial direction of the U-shaped water passage and move downward along the peripheral direction in this part. Therefore, muddy water and the like are less likely to infiltrate into an inside part in the radial direction of the U-shaped water passage. Consequently, infiltration of muddy water and the like into the inside of the auto-tensioner can be more reliably suppressed.

The auto-tensioner of a third aspect of the present invention, in the first or second aspect, further includes: an elastic body which has one end locked to one member of the rotatable member and the stationary member and the other end that is a free end, and extends along an inner peripheral surface of the cylindrical portion of the other member of the rotatable member and the stationary member; and a friction member which is joined immovable relative to the elastic body in the peripheral direction and comes into contact with the inner peripheral surface of the cylindrical portion of the other member of the rotatable member and the stationary member.

In this configuration, when the tension of a belt is changed and the rotatable member is rotated relative to the stationary member, the friction member slides on the stationary member or the rotatable member. Accordingly, the oscillation of the rotatable member can be suppressed and damped. Furthermore, friction forces generated between the friction member and the sliding object can be made a difference between the cases where the tension of the belt is increased and decreased.

According to the auto-tensioner of a fourth aspect of the present invention, in any of the first to third aspects, the drainage port communicates with a lower portion of the water passage.

In this configuration, muddy water and the like flowing into the water passage can be reliably discharged from the drainage port.

According to the auto-tensioner of a fifth aspect of the present invention, in the third or fourth aspect, the drainage port is formed in the cylindrical portion of the other member, and the friction member is not present on an inside of the cylindrical portion of the other member in a peripheral direction range of the drainage port.

In this configuration, even in the case where muddy water and the like infiltrate into the inside of the cylindrical portion of the other member from the drainage port, since the friction member is not present at the position that is most affected by the muddy water and the like infiltrating from the drainage port, wear of the friction member can be suppressed.

MODE FOR CARRYING OUT THE INVENTION

First Embodiment

An auto-tensioner 1 according to a first embodiment of the present invention will be described below.

The auto-tensioner 1 of this embodiment adjusts the tension of a transmission belt for transmitting power of the crankshaft of an engine to auxiliary machines and is mounted to the engine block of a vehicle.

Figure 1:
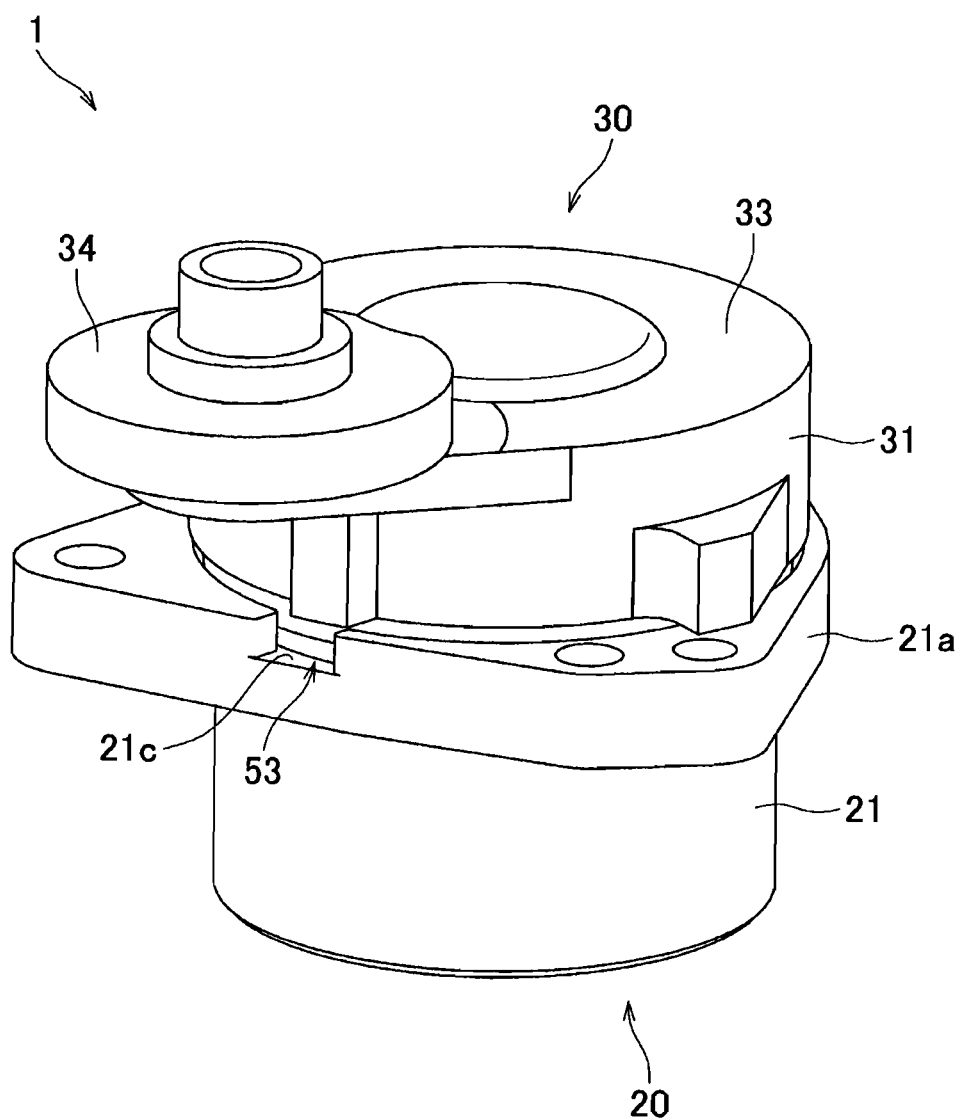
FIG. 1 is a perspective view of an auto-tensioner of a first embodiment of the present invention.
Figure 2:
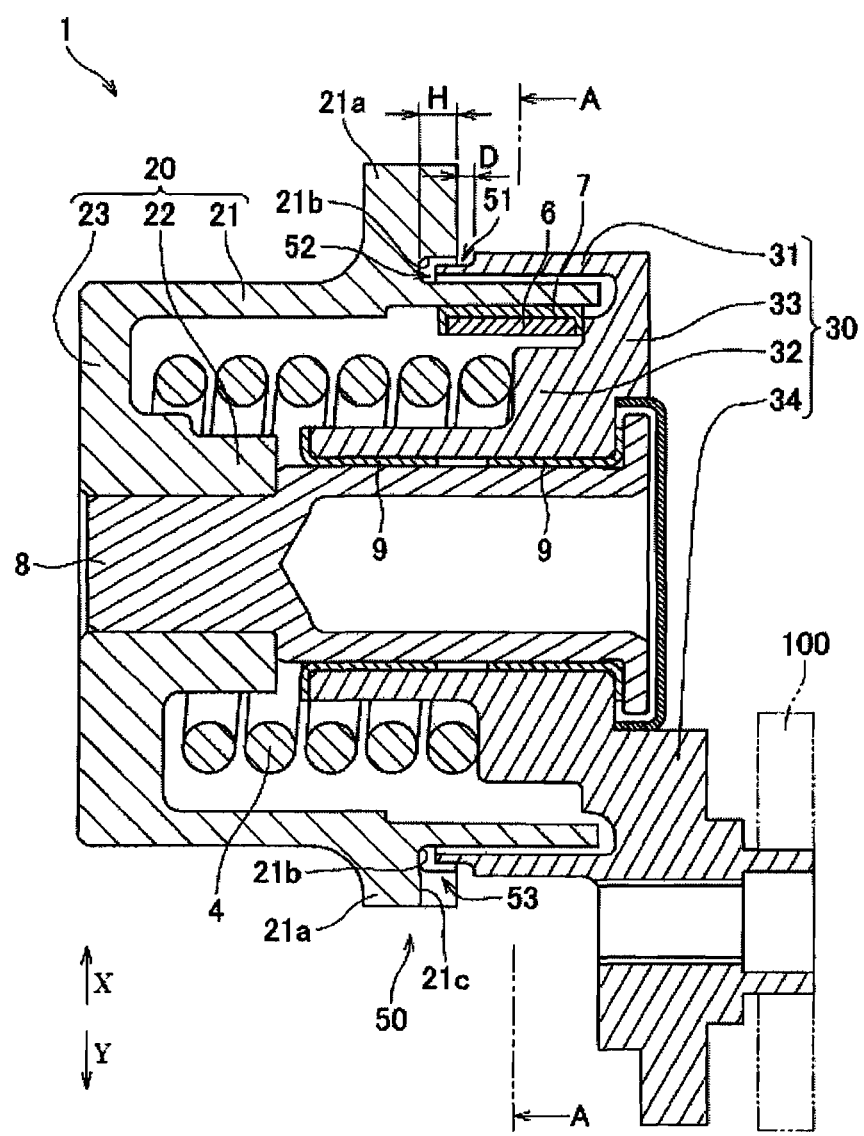
FIG. 2 is a cross-sectional view of the auto-tensioner illustrated in FIG. 1.

As illustrated in FIG. 1 and FIG. 2, the auto-tensioner 1 includes a stationary member 20, a rotatable member 30, a coil spring 4, a drainage mechanism 50, a leaf spring (elastic body) 6, and a plurality of friction members 7. A pulley 100 on which a transmission belt is wound is to be mounted to the rotatable member 30. In addition, the rotatable member 30 is supported rotatably relative to the stationary member 20 via a shaft 8 and bushes 9. In the following description, the direction of the rotary axis of the rotatable member 30 (the axial direction of the shaft 8) is simply referred to as an axial direction. Incidentally, in FIG. 2, a form of the surrounding portions of the coil spring 4 and the drainage mechanism 50 viewed in backward of the line of sight from the cross-section is also illustrated, but the other parts are illustrated only in cross-section. In addition, in FIG. 6 to FIG. 8 and FIG. 10 of a modification example and a second embodiment described later, the same applies.

Figure 4:
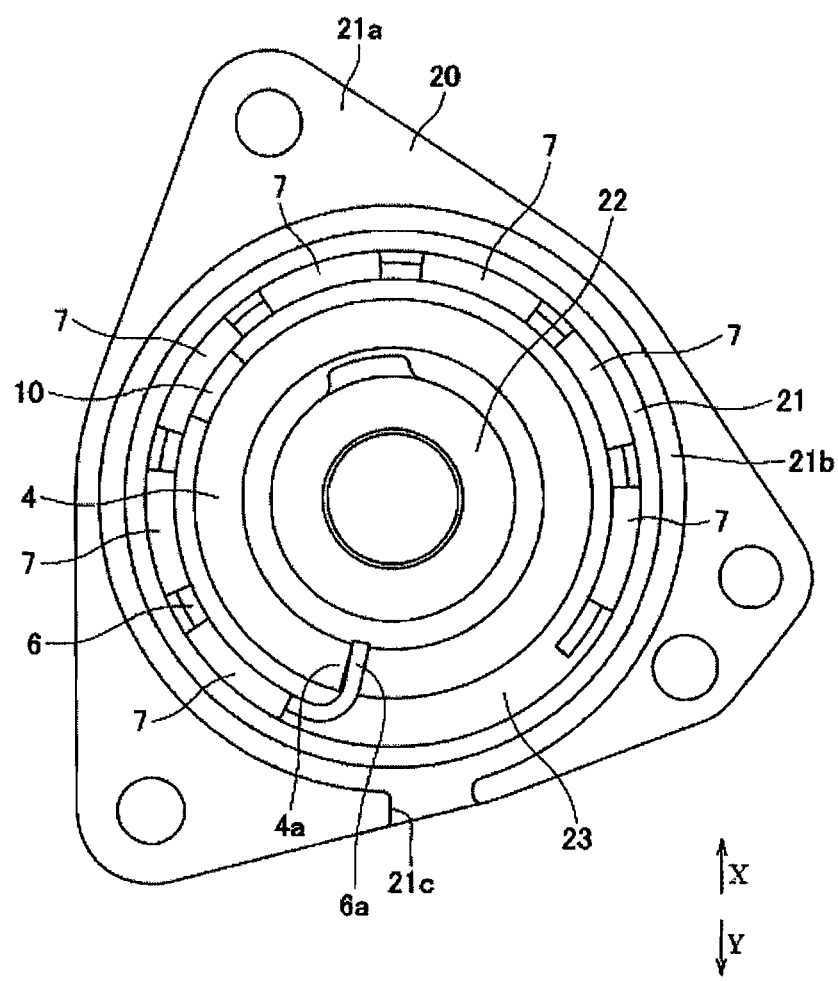
FIG. 4 is a diagram of a stationary member and members mounted to the stationary member illustrated in FIG. 1, viewed from the right in FIG. 1.
Figure 5:
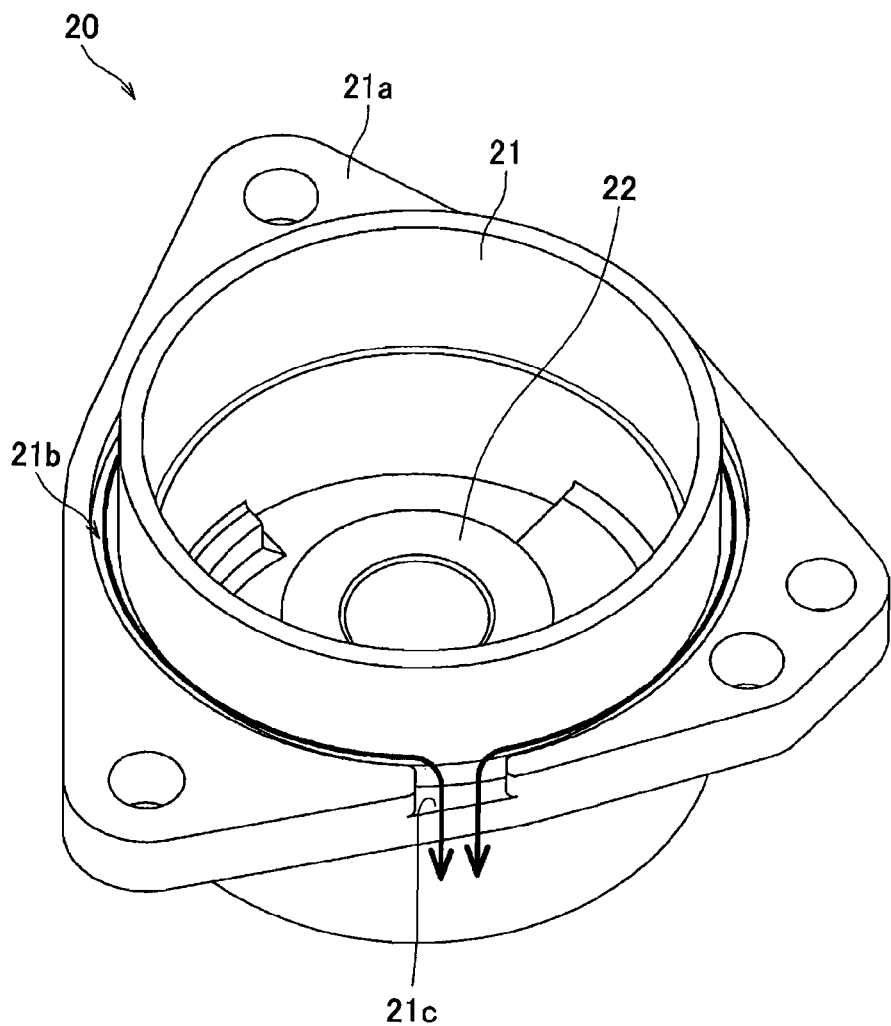
FIG. 5 is a perspective view of the stationary member illustrated in FIG. 1.
Figure 6:
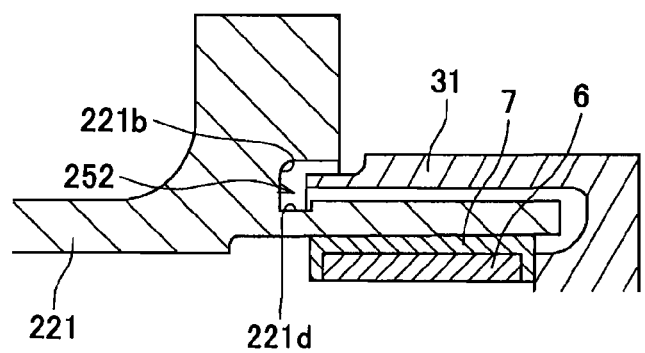
FIG. 6 is a partial cross-sectional view of an auto-tensioner of a modification example of the first embodiment.

The stationary member 20 is fixed to a non-illustrated engine block so that the up and down direction thereof is the upward and downward direction (arrow X: upper direction, arrow Y: downward direction) shown in FIG. 2 and FIG. 4. The stationary member 20 is constituted by an outer cylindrical portion (first cylindrical portion) 21, an inner cylindrical portion 22 disposed inside the outer cylindrical portion 21, and an annular bottom wall portion 23 connecting the outer cylindrical portion 21 and the inner cylindrical portion 22. The inner cylindrical portion 22 is fixed unrotatably relative to the shaft 8. As illustrated in FIG. 4 and FIG. 5, substantially at the center in the axial direction of the outer cylindrical portion 21, a substantially triangular flange portion 21a is provided. Incidentally, in the specification, "upward" and "downward" respectively mean "vertically upward" and "vertically downward" unless otherwise noted.

As illustrated in FIG. 4 and FIG. 5, in the outer peripheral surface (specifically, the flange portion 21a) of the outer cylindrical portion 21, a water collecting groove 21b is formed over the entire periphery. The depth direction of the water collecting groove 21b is in the axial direction, and a depth H (see FIG. 2) of the water collecting groove 21b is, for example, 2 to 5 mm. In the case where the water collecting groove 21b is too deep, the strength of the stationary member 20 cannot be maintained, and in the case where it is too shallow, a function of collecting water is not achieved. Therefore, the depth of the water collecting groove 21b is preferably in the above range.

As illustrated in FIG. 1 and FIG. 5, a cutout 21c is formed in the peripheral wall (flange portion 21a) on the outer side in the radial direction of the water collecting groove 21b. By the cutout 21c, a drainage port 53 of the drainage mechanism 50 is configured. As illustrated in FIG. 1 and FIG. 4, the stationary member 20 is installed so that the drainage port 53 is positioned on the lower side of the water collecting groove 21b. A peripheral direction range L of the drainage port 53 is preferably a range of 20 degrees (a in FIG. 3) each in the clockwise direction and the counterclockwise direction from the position immediately below the central axis of rotation.

The rotatable member 30 is constituted by an outer cylindrical portion (second cylindrical portion) 31, an inner cylindrical portion 32 disposed inside the outer cylindrical portion 31, an annular bottom wall portion 33 connecting the outer cylindrical portion 31 and the inner cylindrical portion 32, and a pulley support portion 34. The pulley 100 is detachably mounted to the pulley support portion 34.

Figure 3:
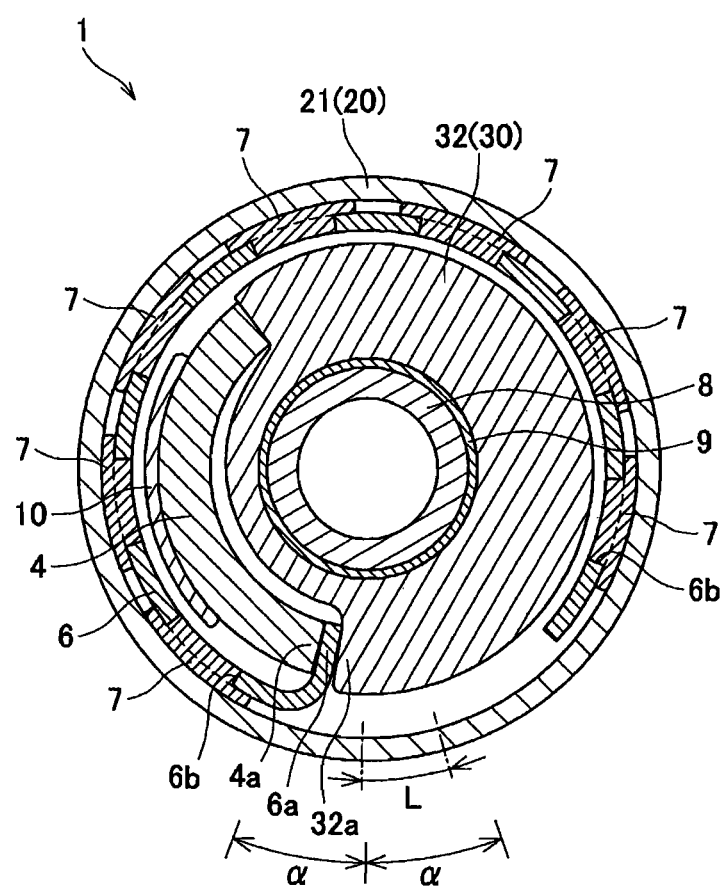
FIG. 3 is a cross-sectional view taken along line A-A of FIG. 2.

The inner cylindrical portion 32 is disposed side by side to the inner cylindrical portion 22 of the stationary member 20 in the axial direction. The inner cylindrical portion 32 is mounted rotatably relative to the shaft 8 via the bushes 9. Accordingly, the rotatable member 30 is rotatable relative to the stationary member 20. The inner cylindrical portion 32 has a larger outside diameter in the right part than that in the left part in FIG. 2. A surface of the part with the larger outside diameter and facing the coil spring 4 is formed in a spiral shape so as to be along the coil spring 4. Therefore, as illustrated in FIG. 3, a stepped portion 32a is formed at the boundary of the start position and the end position of the spiral. Incidentally, in FIG. 3, illustration of the outer cylindrical portion 31 of the rotatable member 30 is omitted.

The outer cylindrical portion 31 is disposed to overlap the outer cylindrical portion 21 of the stationary member 20 in the radial direction. Specifically, the outer cylindrical portion 31 is disposed on the outer side in the radial direction of the outer cylindrical portion 21 of the stationary member 20. In addition, the tip end portion of the outer cylindrical portion 31 is inserted into the inside of the water collecting groove 21b formed in the outer cylindrical portion 21 of the stationary member 20. Therefore, the gap between the water collecting groove 21b and the tip end portion of the outer cylindrical portion 31 of the rotatable member 30 has a U shape. The U-shaped gap forms a water passage 52 of the drainage mechanism 50. The water passage 52 is formed over the entire periphery.

In addition, a part obtained by excluding the drainage port 53 from the gap between the outer peripheral surface of the outer cylindrical portion 21 of the stationary member 20 and the outer peripheral surface of the outer cylindrical portion 31 of the rotatable member 30 forms a water inlet 51 of the drainage mechanism 50. The water inlet 51 is open along the peripheral direction. An interval D (see FIG. 2) of the water inlet 51 is, for example, 1 to 3 mm. In the case where the water inlet 51 is too large, there is a problem in that dirt easily infiltrates and the gap becomes clogged, and in the case where it is too small, dirt is likely to collect. Therefore, the interval of the water inlet 51 is preferably in the above range.

The drainage mechanism 50 is for preventing muddy water and the like from infiltrating into the inside of the autotensioner 1. The drainage mechanism 50 is provided at the boundary part of the outer cylindrical portion 21 of the stationary member 20 and the outer cylindrical portion 31 of the rotatable member 30 and is constituted by the water inlet 51, the water passage 52, and the drainage port 53 described above.

As illustrated in FIG. 2, the coil spring 4 is disposed inside the outer cylindrical portion 21 of the stationary member 20 and the outer cylindrical portion 31 of the rotatable member 30. One end portion 4a (right end portion in FIG. 2) of the coil spring 4 is locked to the rotatable member 30, and the other end portion (left end portion in FIG. 2) is locked to the stationary member 20, so that the rotatable member 30 is biased to rotate relative to the stationary member 20 in one direction. The biasing direction of the coil spring 4 is a direction in which a tension is to be applied to the transmission belt wound on the pulley 100.

As illustrated in FIG. 3, the end portion 4a of the coil spring 4 presses the stepped portion 32a of the rotatable member 30 via the leaf spring 6, and accordingly, the end portion of the coil spring 4 is locked to the rotatable member 30. A method of locking the end portion of the coil spring 4 to the stationary member 20 is not particularly limited. For example, the other end portion of the coil spring 4 is fitted into a groove portion formed in the stationary member 20, or a bent end portion of the coil spring 4 is press-fitted to a locking hole which is formed in the stationary member 20 and extends in the radial direction or the axial direction to be locked.

As illustrated in FIG. 3 and FIG. 4, a coil spring support member 10 for suppressing the tilt of the position of the coil spring 4 is mounted to the coil spring 4. The coil spring support member 10 is interposed between the friction member 7 and the coil spring 4 (see FIG. 4). Incidentally, the coil spring support member 10 may not be provided.

As illustrated in FIG. 2 and FIG. 3, the leaf spring (elastic body) 6 is disposed on the inside of the tip end side part of the outer cylindrical portion 21 of the stationary member 20 and extends along the inner peripheral surface of the outer cylindrical portion 21. As illustrated in FIG. 3, one end portion 6a of the leaf spring 6 is bent at 90 degrees toward the inside in the radial direction and is nipped between the stepped portion 32a of the rotatable member 30 and the end portion 4a of the coil spring 4. Accordingly, the end portion 6a of the leaf spring 6 is locked to the rotatable member 30. An end portion on the opposite end to the end portion 6a of the leaf spring 6 is a free end. In addition, in the leaf spring 6, a plurality of mounting holes 6b to which the plurality of friction members 7 are mounted are formed side by side to the peripheral direction.

The plurality of (in this embodiment, seven) friction members 7 are arranged between the inner peripheral surface of the outer cylindrical portion 21 of the stationary member 20 and the leaf spring 6. The plurality of friction members 7 are arranged side by side to the peripheral direction outside a peripheral direction range L of the drainage port 53. The plurality of friction members 7 are preferably arranged outside a range of 20 degrees (a in FIG. 3) each in the clockwise direction and the counterclockwise direction from the position immediately below the central axis of rotation. The friction members 7 are fitted into the mounting holes 6b formed in the leaf spring 6 and are joined so as to be immovable relative to the leaf spring 6 in the peripheral direction. The leaf spring 6 is disposed in a state of being slightly contracted in diameter, and thus the friction members 7 receive a self-elastic diameter-enlarging force of the leaf spring 6 and always come into contact with the inner peripheral surface of the outer cylindrical portion 21 of the stationary member 20. The friction member 7 is formed to mainly contain, for example, a synthetic resin such as a polyamide resin including Nylon 66, a polyacetal resin, a polyarylate resin, a phenol resin, a polyphenylene sulfide (PPS) resin, or an ultra-high-molecular-weight polyethylene resin.

In a case where the tension of the transmission belt is increased, the rotatable member 30 is rotated in the clockwise direction of FIG. 3 against the biasing force of the coil spring 4. At this time, the end portion 6a of the leaf spring 6 is moved in the clockwise direction of FIG. 3 (a direction away from the free end), and thus the leaf spring 6 is entirely moved in the peripheral direction and is deformed to be slightly enlarged in diameter. Accordingly, a force of the friction members 7 being pressed to the inner peripheral surface of the outer cylindrical portion 21 of the stationary member 20 is increased, and a large frictional force is generated between the friction members 7 and the outer cylindrical portion 21 of the stationary member 20. The frictional force acts as a damping force of suppressing and damping the oscillation of the rotatable member 30.

On the other hand, in a case where the tension of the transmission belt is reduced, the rotatable member 30 is rotated in the counterclockwise direction of FIG. 3 by the biasing force of the coil spring 4. At this time, the end portion 6a of the leaf spring 6 is moved in the counterclockwise direction of FIG. 3 (a direction toward the free end), and thus the leaf spring 6 is entirely moved in the peripheral direction and is deformed to be slightly contracted in diameter. Accordingly, a force of the friction members 7 being pressed to the inner peripheral surface of the outer cylindrical portion 21 of the stationary member 20 is decreased, and only a small frictional force is generated between the friction members 7 and the outer cylindrical portion 21 of the stationary member 20.

As described above, in the auto-tensioner 1 of this embodiment, the friction forces generated between the friction members 7 and the outer cylindrical portion 21 of the stationary member 20 can be made a difference between the cases where the tension of the belt is increased and decreased.

Since the auto-tensioner 1 of this embodiment is installed so that the axial direction thereof is substantially in a horizontal direction, muddy water, engine oil and the like that flow into the water inlet 51 flow into the water passage 52 provided on the inside in the radial direction of the water inlet 51, move downward along the peripheral direction in the water passage 52, and thereafter are discharged to the outside from the drainage port 53. Therefore, muddy water and the like can be smoothly discharged while suppressing the infiltration of the muddy water and the like into the inside of the auto-tensioner 1. As a result, acceleration in the wear of the friction members 7 due to the muddy water and the like infiltrating between the friction members 7 and the sliding object can be prevented, thereby elongating the life-span of the friction members 7.

In addition, in this embodiment, since the tip end portion of the outer cylindrical portion 31 is inserted into the water collecting groove 21b, the water passage 52 has a U shape. Accordingly, muddy water and the like flowing into the water inlet 51 flow into an outside part in the radial direction of the U-shaped water passage 52 and move downward along the peripheral direction in this part. Therefore, muddy water and the like are less likely to infiltrate into the inside part in the radial direction of the U-shaped water passage 52. Consequently, infiltration of muddy water and the like into the inside of the auto-tensioner 1 can be more reliably suppressed.

In addition, in this embodiment, since the drainage port 53 communicates with the lower portion of the water passage 52, muddy water and the like flowing into the water passage 52 can be reliably discharged from the drainage port 53.

In addition, in this embodiment, in the peripheral direction range L of the drainage port 53, the friction members 7 are not present inside the outer cylindrical portion 21 of the stationary member 20. Therefore, even when muddy water and the like are splashed by the wheel axles from the lower portion of the vehicle, stick to the drainage port 53 and infiltrate into the inside, since the friction members are not present at the positions that are most affected by the muddy water and the like infiltrating from the drainage port 53, wear of the friction members 7 can be suppressed.

In addition, in this embodiment, since the cutout 21c that forms the drainage port 53 is provided in the stationary member 20, the position of the drainage port 53 is constant regardless of the rotation of the rotatable member 30.

In addition, in this embodiment, since the depth direction of the water collecting groove 21b is in the axial direction, compared to a case where the depth direction is in the radial direction, a reduction in the strength of the stationary member 20 due to the water collecting groove being provided can be suppressed.

Incidentally, the auto-tensioner 1 of this embodiment can be put into practice in the following modifications.

In this embodiment, all of the plurality of friction members 7 are arranged outside the peripheral direction range L of the drainage port 53. However, any of the plurality of friction members 7 may also be disposed inside the peripheral direction range L of the drainage port 53.

The leaf spring 6 and the friction members 7 for damping the oscillation of the rotatable member 30 may not be provided. In addition, the friction members 7 do not need to be provided plurally but may also be one.

In this embodiment, the number of drainage ports 53 is one but may also be plural. That is, the number of cutouts 21c formed in the peripheral wall of the water collecting groove 21b on the outside in the radial direction may also be plural.

In the above embodiment, among the outer peripheral surface of the outer cylindrical portion 21 of the stationary member 20, the part facing the inner peripheral surface of the outer cylindrical portion 31 of the rotatable member 30 has a flat shape (the diameter thereof is constant), but the embodiment is not limited to this configuration. For example, as in an outer cylindrical portion 221 of the stationary member illustrated in FIG. 6, a groove 221d may also be formed in the peripheral wall of a water collecting groove 221b on the inside in the radial direction. The groove 221d may be formed over the entire region in the peripheral direction of the water collecting groove 221b or may also be formed only in a part of the peripheral direction range of the water collecting groove 221b. By providing the groove 221d, a larger amount of water can be collected by the water passage 252, and thus infiltration of water into the inside of the auto-tensioner can be further suppressed.

Figure 7:
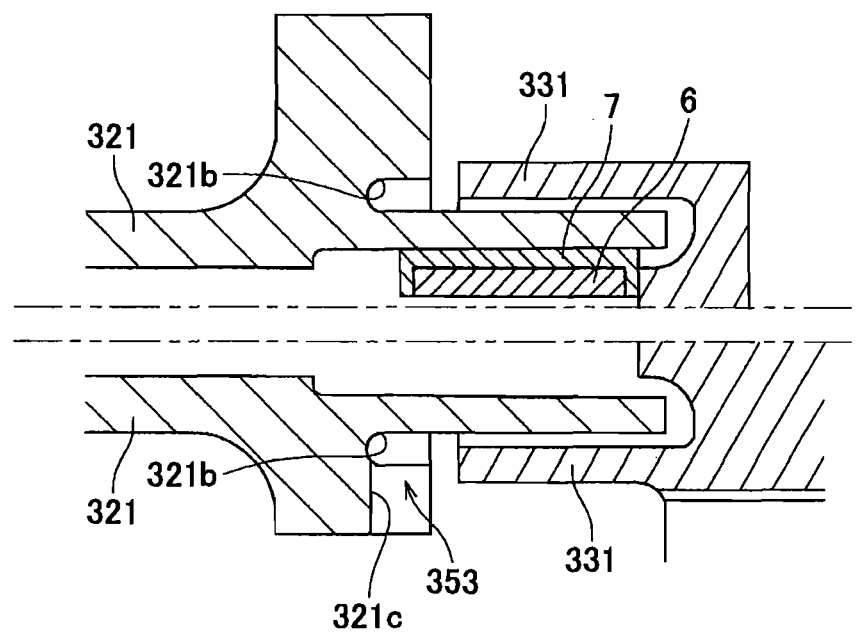
FIG. 7 is a partial cross-sectional view of an auto-tensioner of a modification example of the first embodiment.

In this embodiment, the tip end portion of the outer cylindrical portion 31 of the rotatable member 30 is inserted into the inside of the water collecting groove 21b formed in the outer cylindrical portion 21 of the stationary member 20. However, for example, as illustrated in FIG. 7, the tip end portion of an outer cylindrical portion 331 of the rotatable member may not be inserted into the inside of a water collecting groove 321b formed in an outer cylindrical portion 321 of the stationary member.

In the case of this modification example, similarly to this embodiment, a drainage port 353 is configured by a cutout 321c formed in the peripheral wall of the water collecting groove 321b on the outside in the radial direction.

Figure 8:
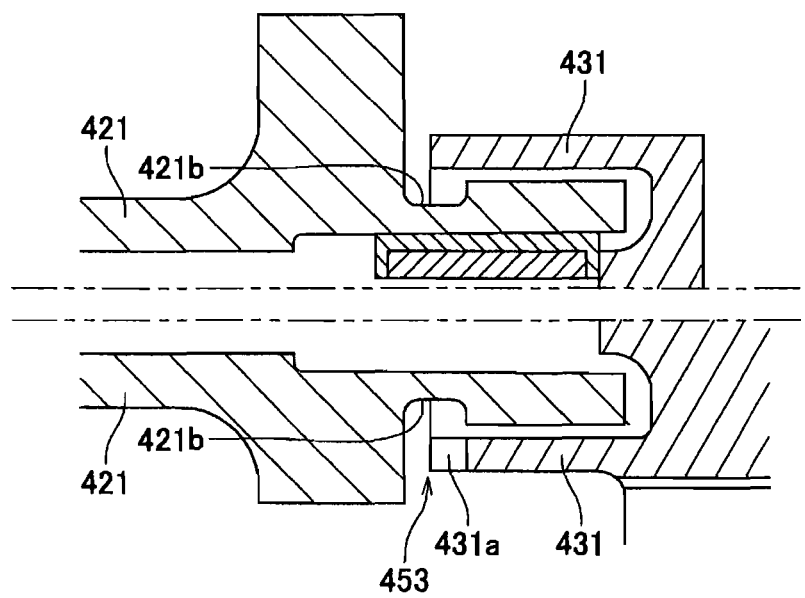
FIG. 8 is a partial cross-sectional view of an auto-tensioner of a modification example of the first embodiment.

In this embodiment, the water collecting groove 21b is formed so that the depth direction thereof is in the axial direction. However, for example, as illustrated in FIG. 8, a water collecting groove 421b may also be formed so that the depth direction thereof is in the radial direction.

In the case of this modification example, a drainage port 453 is configured by the gap between a cutout 431a formed in the tip end portion of an outer cylindrical portion 431 of the rotatable member and an outer cylindrical portion 421 of the stationary member.

Second Embodiment

Next, an auto-tensioner 501 according to a second embodiment of the present invention will be described. Here, those having the same configurations as in the first embodiment are denoted by the same reference numerals, and description thereof will be appropriately omitted.

Figure 9:
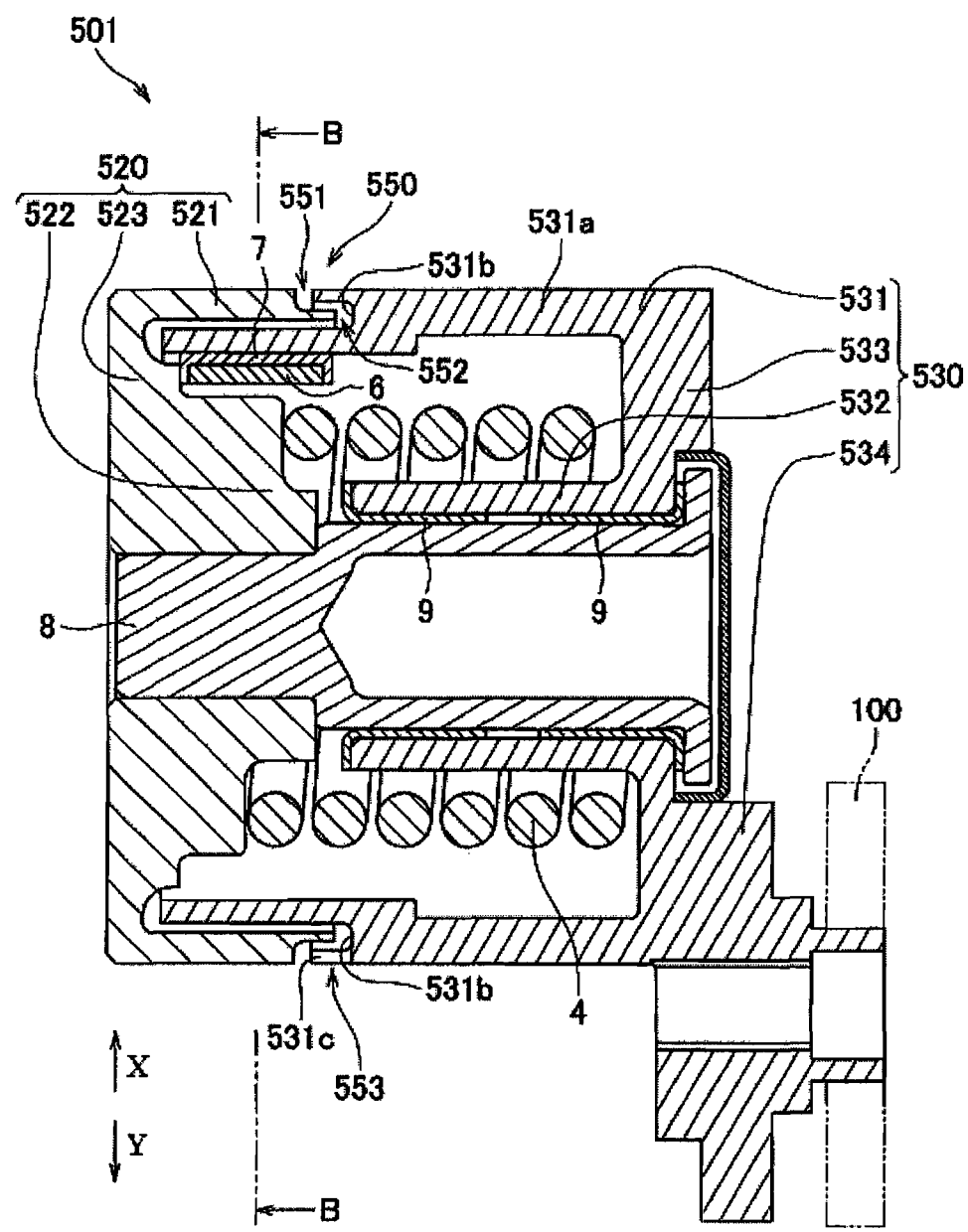
FIG. 9 is a cross-sectional view of an auto-tensioner of a second embodiment of the present invention.
Figure 10:
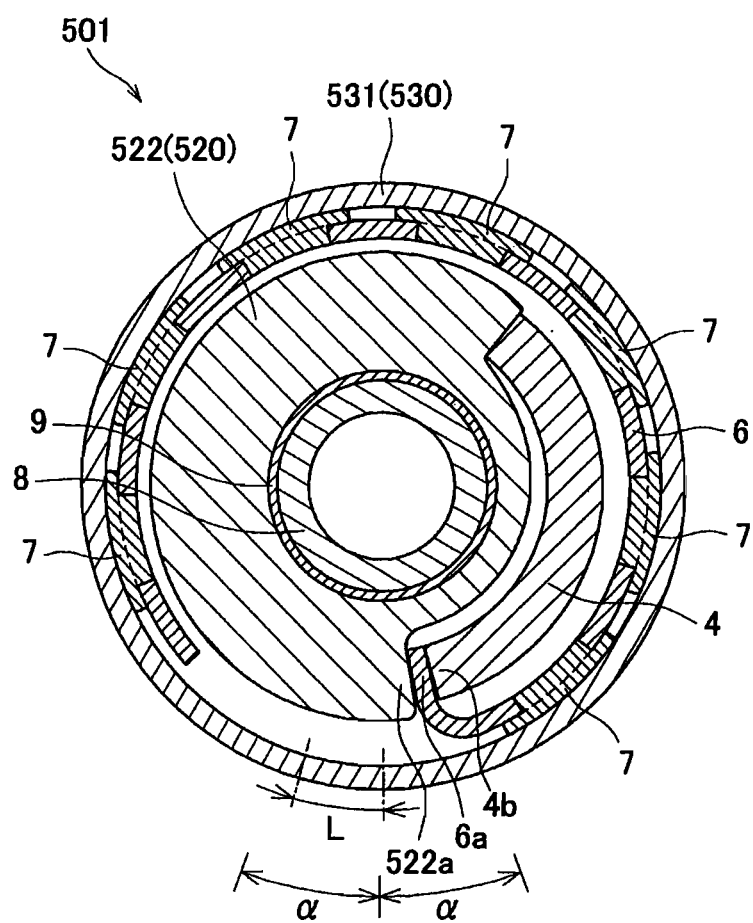
FIG. 10 is a cross-sectional view taken along line B-B of FIG. 9.

As illustrated in FIG. 9 and FIG. 10, the auto-tensioner 501 of this embodiment includes a stationary member 520, a rotatable member 530, a coil spring 4, a drainage mechanism 550, a leaf spring (elastic body) 6, and a plurality of friction members 7. Incidentally, in FIG. 10, illustration of an outer cylindrical portion 521 of the stationary member 520 is omitted.

The stationary member 520 is constituted by the outer cylindrical portion (first cylindrical portion) 521, an inner cylindrical portion 522, and a bottom wall portion 523. The inner cylindrical portion 522 is fixed unrotatably relative to a shaft 8. The inner cylindrical portion 522 is formed in a spiral shape so that a surface thereof facing the coil spring 4 in the axial direction is along the coil spring 4. Therefore, as illustrated in FIG. 10, a stepped portion 522a is formed at the boundary of the start position and the end position of the spiral.

The rotatable member 530 is constituted by an outer cylindrical portion (second cylindrical portion) 531, an inner cylindrical portion 532, a bottom wall portion 533, and a pulley support portion 534. The pulley support portion 534 is formed in the same manner as that of the pulley support portion 34 of the first embodiment. The inner cylindrical portion 532 is mounted rotatably relative to the shaft 8 via bushes 9.

The outside diameter of the outer cylindrical portion 531 on the base portion side is larger than that on the tip end side. The part having a larger outside diameter is referred to as a large-diameter portion 531a. In the outer peripheral surface (specifically, the large-diameter portion 531a) of the outer cylindrical portion 531, a water collecting groove 531b is formed over the entire periphery thereof. The depth direction of the water collecting groove 531b is in the axial direction.

As illustrated in FIG. 9, a cutout 531c is formed in the peripheral wall on the outer side in the radial direction of the water collecting groove 531b. By the cutout 531c, a drainage port 553 of the drainage mechanism 550 is configured. The auto-tensioner 501 of this embodiment is installed so that the cutout 531c (the drainage port 553) of the rotatable member 530 is positioned on the lower side of the water collecting groove 531b. A peripheral direction range L of the drainage port 553 is preferably a range in which a peripheral direction angle thereof is 40 degrees or less. Incidentally, the oscillation angle of the rotatable member 530 is in a range of +15 degrees to −15 degrees.

The tip end portion of the outer cylindrical portion 531 of the rotatable member 530 is disposed to overlap the outer cylindrical portion 521 of the stationary member 520 in the radial direction. In the first embodiment, the outer cylindrical portion 31 of the rotatable member 30 is disposed on the outside in the radial direction of the outer cylindrical portion 21 of the stationary member 20. However, in this embodiment, the outer cylindrical portion 521 of the stationary member 520 is disposed on the outside in the radial direction of the outer cylindrical portion 531 of the rotatable member 530.

The tip end portion of the outer cylindrical portion 521 of the stationary member 520 is inserted into the inside of the water collecting groove 531b formed in the outer cylindrical portion 531 of the rotatable member 530. Therefore, the gap between the water collecting groove 531b and the tip end portion of the outer cylindrical portion 521 of the stationary member 520 has a U shape. The U-shaped gap forms a water passage 552 of the drainage mechanism 550.

A part obtained by excluding the drainage port 553 from the gap between the outer peripheral surface of the outer cylindrical portion 521 of the stationary member 520 and the outer peripheral surface of the outer cylindrical portion 531 of the rotatable member 530 forms a water inlet 551 of the drainage mechanism 550. The drainage mechanism 550 is constituted by the water inlet 551, the water passage 552, and the drainage port 553 described above.

Both end portions of the coil spring 4 are respectively locked to the stationary member 520 and the rotatable member 530. As illustrated in FIG. 10, a method of locking the end portion of coil spring 4 to the stationary member 520 is the same as the method of locking the end portion of coil spring 4 to the rotatable member 30 in the first embodiment. That is, the left end portion 4b of the coil spring 4 in FIG. 10 is press-fitted to the stepped portion 522a of the stationary member 520 via the leaf spring 6, and accordingly, the end portion 4b of the coil spring 4 is locked to the stationary member 520. A method of locking the end portion of the coil spring 4 to the rotatable member 530 is not particularly limited.

In the first embodiment, the leaf spring 6 is disposed along the inner peripheral surface of the outer cylindrical portion 21 of the stationary member 20. However, in this embodiment, the leaf spring 6 is disposed along the inner peripheral surface of the outer cylindrical portion 531 of the rotatable member 530. In addition, one end portion of the leaf spring 6 is bent at 90 degrees toward the inside in the radial direction and is nipped between the stepped portion 522a of the bottom wall portion 523 of the stationary member 520 and the end portion 4b of the coil spring 4. The other end portion of the leaf spring 6 is a free end.

In the first embodiment, the plurality of friction members 7 come into contact with the inner peripheral surface of the outer cylindrical portion 21 of the stationary member 20. However, in this embodiment, the plurality of friction members 7 come into contact with the inner peripheral surface of the outer cylindrical portion 531 of the rotatable member 530. In addition, the plurality of friction members 7 are disposed side by side to the peripheral direction outside a peripheral direction range L of the drainage port 553. The plurality of friction members 7 are preferably disposed between the outer cylindrical portion 531 and the leaf spring 6 so that the plurality of friction members 7 are positioned outside a range of 20 degrees (a in FIG. 10) each in the clockwise direction and the counterclockwise direction from the position immediately below the central axis of rotation when the drainage port 553 is positioned at the lowermost portion of the water collecting groove 531b as illustrated in FIG. 9. A method of joining the leaf spring 6 and the friction members 7 is the same as that in the first embodiment.

In a case where the tension of the transmission belt is increased, the rotatable member 530 is rotated in the counterclockwise direction of FIG. 10 against the biasing force of the coil spring 4. According to the rotation of the outer cylindrical portion 531 of the rotatable member 530, the friction members 7 slide on the inner peripheral surface of the outer cylindrical portion 531 of the rotatable member 530 and the leaf spring 6 is deformed to be slightly enlarged in diameter. Accordingly, a force of the friction members 7 being pressed to the inner peripheral surface of the outer cylindrical portion 531 of the rotatable member 530 is increased, and a large frictional force is generated between the friction members 7 and the outer cylindrical portion 531 of the rotatable member 530. The frictional force acts as a damping force of suppressing and damping the oscillation of the rotatable member 530.

On the other hand, in a case where the tension of the transmission belt is reduced, the rotatable member 530 is rotated in the clockwise direction of FIG. 10 by the biasing force of the coil spring 4. According to the rotation of the outer cylindrical portion 531 of the rotatable member 530, the friction members 7 slide on the inner peripheral surface of the outer cylindrical portion 531 of the rotatable member 530 and the leaf spring 6 is deformed to be slightly contracted in diameter. Therefore, a force of the friction members 7 being pressed to the inner peripheral surface of the outer cylindrical portion 531 of the rotatable member 530 is decreased, and only a small frictional force is generated between the friction members 7 and the outer cylindrical portion 531 of the rotatable member 530. Accordingly, the friction forces generated between the friction members 7 and the outer cylindrical portion 531 of the rotatable member 530 can be made a difference between the cases where the tension of the belt is increased and decreased.

In addition, in the auto-tensioner 501 of this embodiment, muddy water and the like flowing into the water inlet 551 flow into the water passage 552, move downward along the peripheral direction in the water passage 552, and thereafter, are discharged to the outside from the drainage port 553. Therefore, the collected muddy water and the like can be smoothly discharged while suppressing the infiltration of the muddy water and the like into the inside of the auto-tensioner 501.

In addition, in this embodiment, since the water passage 552 has a U shape, similarly to the first embodiment, the infiltration of muddy water and the like into the inside of the auto-tensioner 501 can be more reliably suppressed.

In addition, in this embodiment, since the drainage port 553 communicates with the lower portion of the water passage 552, muddy water and the like flowing into the water passage 552 can be reliably discharged from the drainage port 553.

In addition, in this embodiment, in the peripheral direction range L of the drainage port 553, the friction members 7 are not present inside the outer cylindrical portion 531 of the rotatable member 530. Therefore, even when muddy water and the like infiltrate into the inside from the drainage port 553, since the friction members are not present at the positions that are most affected by the muddy water and the like infiltrating from the drainage port 553, wear of the friction members 7 can be suppressed.

In addition, the auto-tensioner 501 of this embodiment can be put into practice in the same modifications as in the modification examples of the first embodiment described above.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2011-100826, filed on Apr. 28, 2011, and Japanese Patent Application No. 2012-52991, filed on Mar. 9, 2012, the entirety of which is invoked herein by reference.

DESCRIPTION OF REFERENCE NUMERALS AND SIGNS 1, 501: auto-tensioner
4: coil spring
6: leaf spring (elastic body)
7: friction member
20, 520: stationary member
21, 221, 321, 421, 521: outer cylindrical portion (first cylindrical portion)
21b, 221b, 321b, 421b, 531b: water collecting groove
30, 530: rotatable member
31, 331, 431, 531: outer cylindrical portion (second cylindrical portion)
50, 550: drainage mechanism
51, 551: water inlet
52, 252, 552: water passage
53, 353, 453, 553: drainage port

The invention claimed is:

1. An auto-tensioner comprising:
a stationary member having a first cylindrical portion;
a rotatable member which has a second cylindrical portion of which at least a part is disposed to overlap the first cylindrical portion in a radial direction, and is supported rotatably relative to the stationary member;
a coil spring which is accommodated on insides of the first cylindrical portion and the second cylindrical portion and has one end locked to the stationary member and the other end locked to the rotatable member; and
a drainage mechanism provided at a boundary part of the first cylindrical portion and the second cylindrical portion,
wherein the drainage mechanism comprises
a water inlet configured by a gap between an outer peripheral surface of the first cylindrical portion and an outer peripheral surface of the second cylindrical portion and being open along a peripheral direction,
a water passage which is configured by a gap between a water collecting groove formed along the peripheral direction in the outer peripheral surface of one of the two cylindrical portions and the other cylindrical portion, and communicates with the water inlet, and
at least one drainage port formed in a peripheral wall on an outside in the radial direction of the water passage.

2. The auto-tensioner according to claim 1,
wherein the water collecting groove has a depth direction in a cylinder axial direction of the cylindrical portion, and
the cylindrical portion of the two cylindrical portions, in which no water collecting groove is formed, has a tip end portion inserted into the water collecting groove.

3. The auto-tensioner according to claim 1, further comprising:
an elastic body which has one end locked to one member of the rotatable member and the stationary member and the other end that is a free end, and extends along an inner peripheral surface of the cylindrical portion of the other member of the rotatable member and the stationary member; and
a friction member which is joined immovable relative to the elastic body in the peripheral direction and comes into contact with the inner peripheral surface of the cylindrical portion of the other member of the rotatable member and the stationary member.

4. The auto-tensioner according to claim 1,
wherein the drainage port communicates with a lower portion of the water passage.

5. The auto-tensioner according to claim 3,
wherein the drainage port is formed in the cylindrical portion of the other member, and
the friction member is not present on an inside of the cylindrical portion of the other member in a peripheral direction range of the drainage port.

* * * * *